(12) United States Patent
Matsuoka et al.

(10) Patent No.: US 9,133,043 B2
(45) Date of Patent: Sep. 15, 2015

(54) BIOLOGICAL TREATMENT METHOD FOR TREATING WASTE WATER AND CONTROLLING COD LOADING RATE PER BACTERIUM AND COD CONCENTRATION IN EFFLUENT

(75) Inventors: Keiichi Matsuoka, Kakogawa (JP); Masanori Inukai, Kakogawa (JP); Hironobu Inamasu, Kakogawa (JP); Tetsuo Yamashita, Kobe (JP); Akira Akashi, Kobe (JP)

(73) Assignees: Kansai Coke and Chemicals Co., Ltd., Hyogo (JP); Kobelco Eco-Solutions Co., Ltd., Hyogo (JP)

( * ) Notice: Subject to any disclaimer, the term of this patent is extended or adjusted under 35 U.S.C. 154(b) by 283 days.

(21) Appl. No.: 13/321,669

(22) PCT Filed: Aug. 26, 2010

(86) PCT No.: PCT/JP2010/064500
§ 371 (c)(1),
(2), (4) Date: Nov. 21, 2011

(87) PCT Pub. No.: WO2011/024905
PCT Pub. Date: Mar. 3, 2011

(65) Prior Publication Data
US 2012/0061316 A1 Mar. 15, 2012

(30) Foreign Application Priority Data
Aug. 28, 2009 (JP) .................................. 2009-197994

(51) Int. Cl.
A01K 63/04 (2006.01)
C02F 1/44 (2006.01)
B09C 1/10 (2006.01)
C02F 3/12 (2006.01)
(Continued)

(52) U.S. Cl.
CPC . C02F 3/12 (2013.01); C02F 3/006 (2013.01); C02F 3/341 (2013.01);
(Continued)

(58) Field of Classification Search
CPC ...... A01K 63/04; A01K 63/045; B09C 1/002; B09C 1/10; B01D 23/10; B01D 61/00; B01D 61/025; B01D 61/145; B01D 61/147; B01D 61/16; B01D 35/26; C02F 1/44; C02F 1/444; C02F 3/00; C02F 3/006; C02F 3/10; C02F 3/12; C02F 3/26; C02F 3/28; C02F 3/34; C02F 3/302
See application file for complete search history.

(56) References Cited

U.S. PATENT DOCUMENTS

| 4,732,680 A * | 3/1988 | Weaver et al. ................. 210/610 |
| 5,186,837 A * | 2/1993 | Nikolic et al. ................. 210/614 |
| 6,960,330 B1 * | 11/2005 | Cox, Jr. .......................... 423/226 |

FOREIGN PATENT DOCUMENTS

EP 1873234 A1 * 1/2008 ................ C02F 3/12
(Continued)

OTHER PUBLICATIONS

Wantanbe et al.—Starvation Improves Survival of Bacteria Introduced into Activated Sludge [Sep. 2000; pp. 3905-3910].*

(Continued)

*Primary Examiner* — Dirk Bass
*Assistant Examiner* — Hayden Brewster
(74) *Attorney, Agent, or Firm* — The Webb Law Firm (57) ABSTRACT

The present invention provides a biological treatment method of biologically treating the subject water containing phenol, thiocyanate and the like, which improves the quality of treated water, while suppressing a reduction in treatment efficiency. As a means for achieving the aforementioned object, the present invention relates to a biological treatment method including introducing subject water containing a COD component, wherein the COD component is at least one of phenol and thiocyanate, into a biological treatment tank containing sludge containing bacteria capable of decomposing the COD component to thereby biologically treat the COD component with the bacteria, wherein, before the introduction of the subject water into the biological treatment tank, a step of counting the total number of bacteria contained in the sludge is carried out, so that the amount of the COD component loaded on a single bacterium per unit time can be controlled within a predetermined range.

5 Claims, 5 Drawing Sheets

(51) Int. Cl.
*C02F 3/00* (2006.01)
*C02F 3/34* (2006.01)
C02F 9/00 (2006.01)
C12N 1/20 (2006.01)
C02F 101/10 (2006.01)
C02F 101/16 (2006.01)
C02F 101/18 (2006.01)
C02F 101/34 (2006.01)
C02F 101/38 (2006.01)
C02F 103/18 (2006.01)

(52) U.S. Cl.
CPC ...... *C02F 2101/101* (2013.01); *C02F 2101/16* (2013.01); *C02F 2101/18* (2013.01); *C02F 2101/345* (2013.01); *C02F 2101/38* (2013.01); *C02F 2101/40* (2013.01); *C02F 2103/18* (2013.01); *C02F 2209/08* (2013.01); *C02F 2209/36* (2013.01)

(56) References Cited

FOREIGN PATENT DOCUMENTS

| | | |
|---|---|---|
| JP | 3196900 A | 8/1991 |
| JP | 2002119300 A | 4/2002 |
| JP | 2002224696 A | 8/2002 |
| JP | 2005241518 A | 9/2005 |
| JP | 2008142704 A | 6/2008 |
| JP | 2009142787 A | 7/2009 |
| JP | 2010187576 A | 9/2010 |
| SU | 1168513 A | 7/1985 |
| SU | 1673533 A1 | 8/1991 |
| WO | 02085791 A2 | 10/2002 |
| WO | 2008156151 A1 | 12/2008 |

OTHER PUBLICATIONS

Park et al.—Chemical treatment for treating cyanides-containing effluent [2008; pp. 141-146].*

Ratafia-Brown et al.—An Environmental Assessment of IGCC Power Systems [Sep. 2002; 16 pages].*

Juretschko et al., "Combined Molecular and Conventional Analyses of Nitrifying Bacterium Diversity in Activated Sludge: Nitrosococcus mobilis and Nitrospira-Like Bacteria as Dominant Populations", Applied and Environmental Microbiology, Aug. 1998, pp. 3042-3051, vol. 64, No. 8.

Watanabe et al., "Population Dynamics of Phenol-Degrading Bacteria in Activated Sludge Determined by gyrB-Targeted Quantitative PCR", Applied and Environmental Microbiology, Apr. 1998, pp. 1203-1209, vol. 64, No. 4.

* cited by examiner

BIOLOGICAL TREATMENT METHOD FOR TREATING WASTE WATER AND CONTROLLING COD LOADING RATE PER BACTERIUM AND COD CONCENTRATION IN EFFLUENT

FIELD OF THE INVENTION

The present invention relates to a biological treatment method, and more specifically to a biological treatment method of biologically treating water to be treated containing a COD component, with bacteria.

RELATED ART

Conventionally, gas emitted from coal when coke is produced by dry distillation of the coal contains a large amount of ammonia components. Condensed water generated when exhaust gas emitted from such coke production equipment is cooled, or wastewater emitted from a scrubber after the above described exhaust gas is treated with the scrubber or the like, contains a large amount of ammonia components.

In general, in addition to such ammonia components, such wastewater contains various types of COD components such as phenol and thiocyanate, which are contained in the above described exhaust gas.

Accordingly, as a method of treating the above described wastewater, a biological treatment method using a sludge containing nitrifying bacteria and the like has conventionally been adopted (c.f., Patent Document 1 below).

Meanwhile, in the conventional biological treatment method, widely performed steps include: for example, flowing water to be treated (subject water) containing a treatment target substance, into a biological treatment tank that contains sludge in the form of suspended sludge; and allowing water within the tank, which has been decreased in concentration of the treatment target substance by biological treatment, to overflow from the biological treatment tank, by the inflow of the subject water and to be discharged as treated water.

In this conventional biological treatment method, the concentration of a solid in water in the tank (mixed liquor suspended solid: MLSS) is measured, and the amount of the treatment target substance to be supplied into the biological treatment tank is controlled with respect to the solid concentration, so that the water quality of the treated water can be maintained at a certain level or higher.

More specifically, the inflow of the subject water is controlled, so that the treatment target substance introduced into the biological treatment tank per unit time can be kept at constant per unit solid.

However, in the case of subject water containing phenol or thiocyanate, even if the above described control is carried out, it is difficult to stabilize the water quality of the treated water, and there is a risk that a large amount of COD component unexpectedly remains in the treated water.

In order to cope with this problem, it is attempted to limit the amount of a COD component introduced into a biological treatment tank, so that treated water with desired water quality can be obtained even in a case in which the removal rate of the COD component becomes lowest.

However, in such a case, the amount of a COD component introduced is limited more than necessary. This is not preferable in view of treatment efficiency.

That is to say, a biological treatment method of biologically treating subject water containing at least one of phenol and thiocyanate, has been problematic in that it is difficult to improve the water quality of the treated water, while suppressing a reduction in treatment efficiency.

Patent Document 1: Japanese Patent Application Laid-Open No. 2009-142787

SUMMARY OF THE INVENTION

Problems to be Solved by the Invention

It is an object of the present invention to provide a biological treatment method of biologically treating subject water containing phenol, thiocyanate and the like, which improves the quality of treated water, while suppressing a reduction in treatment efficiency.

Means for Solving Problems

As a result of intensive studies directed towards achieving the aforementioned object, the present inventors have found that, since phenol or thiocyanate easily reduces activity on bacteria, when subject water containing any of these components, is biologically treated, it is difficult to figure out the treating capacity of a biological treatment tank only by focusing on the concentration of a solid.

Moreover, as a result of studies directed towards discovering a new indicator for figuring out the treating capacity of the biological treatment tank, the inventors have found that the amount of a COD component decomposed (oxidized) in the biological treatment tank per unit time correlates with the total number of bacteria contained in the sludge.

Furthermore, the inventors have found that the removal (decomposition) rate of the COD component can be maintained at a high level by using the aforementioned total number of bacteria as an indicator and maintaining the amount of the COD component loaded on a single bacterium per unit time at a certain level, thereby completing the present invention.

Specifically, the biological treatment method according to the present invention, which is directed towards achieving the above described object, is a biological treatment method including introducing subject water containing a COD component, wherein the COD component is at least one of phenol and thiocyanate, into a biological treatment tank containing sludge containing bacteria capable of decomposing the COD component to thereby biologically treat the COD component with the bacteria, wherein, before the introduction of the subject water into the biological treatment tank, a step of counting the total number of bacteria contained in the sludge is carried out, so that the amount of the COD component loaded on a single bacterium per unit time can be controlled within a predetermined range.

It is to be noted that the term "the total number of bacteria" is used herein not to mean the number of bacteria including those that are not substantially involved in a biological treatment, but to mean "the total number of bacteria involved in the biological treatment."

It is also to be noted that "the total number of bacteria involved in the biological treatment" can be counted specifically based on the method described in the examples of the present specification.

Advantages of the Invention

In the present invention, there is carried out a biological treatment, in which sludge containing bacteria capable of decomposing a COD component is placed in a biological treatment tank, then subject water containing the COD component is introduced into the biological treatment tank, and then the subject water is biologically treated with the above described bacteria.

Moreover, before the introduction of the subject water, a step of counting the total number of bacteria contained in the sludge in the biological treatment tank is carried out.

Accordingly, the amount of the COD component introduced into the biological treatment tank can be controlled based on the number of bacteria obtained by the above described counting, and the amount of the COD component loaded on a single bacterium per unit time can be controlled.

That is, by controlling the amount of the COD component loaded on a single bacterium per unit time within a predetermined range, a biological treatment can be carried out while maintaining the removal efficiency of the COD component at a high level, and the water quality of the treated water can be improved while suppressing a reduction in treatment efficiency.

DETAILED DESCRIPTION OF THE PREFERRED EMBODIMENT

Hereinafter, a first embodiment of the present invention will be described with reference to the drawings.

Figure 1:
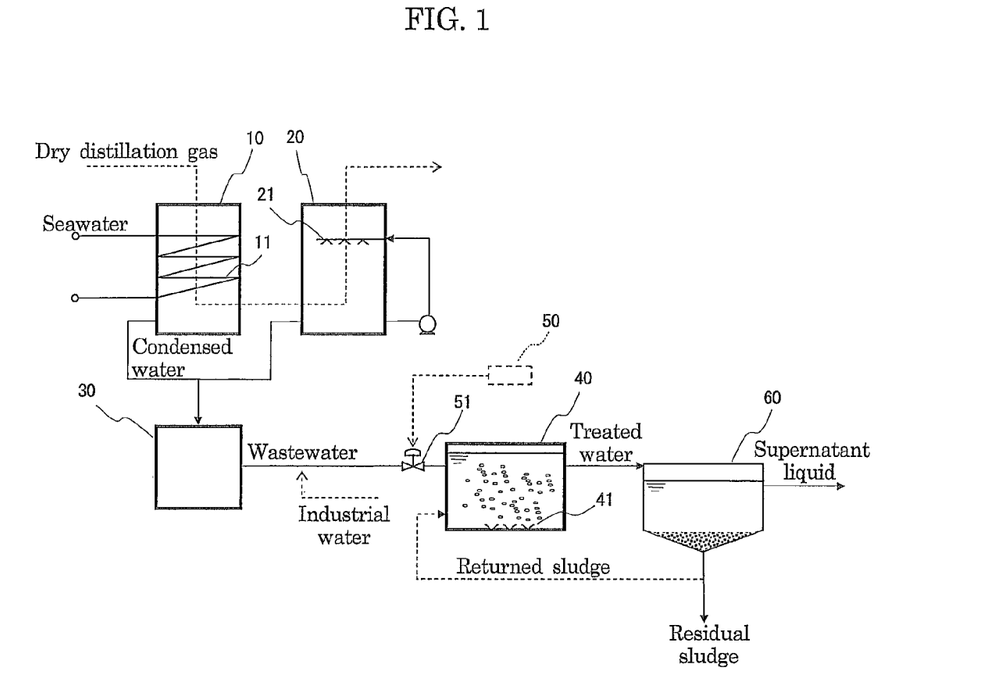
FIG. 1 is a schematic structural diagram showing a configuration of an apparatus used for a biological treatment method in the present embodiment.

FIG. 1 shows a configuration of an apparatus used with regard to a biological treatment method in the present embodiment. Numerical signs 10 and 20 indicate an indirect cooler and a direct cooler for cooling gas generated as a result of dry distillation of coal, respectively. Numerical sign 30 indicates a tar decanter.

With regard to the biological treatment method in the present embodiment, a case in which wastewater discharged from this tar decanter 30 is biologically treated in a biological treatment tank 40 (hereinafter also referred to as "aeration tank 40") under aerobic conditions will be described, for example.

First, subject water, which is subjected to a biological treatment, will be described.

Dry distillation gas generated as a result of dry distillation of coal is subjected to heat exchange through a cooling tube 11 disposed in the indirect cooler 10, so that it is cooled.

At this time, since seawater or the like is supplied into the cooling tube 11, the temperature of the dry distillation gas is significantly decreased, and as a result, condensed water is generated.

This condensed water contains phenol, thiocyanate and the like, as well as components such as tar or ammonia.

Organic components and the like contained in the dry distillation gas are removed by being absorbed into condensed water that has been generated during the cooling operation in the indirect cooler 10.

In the direct cooler 20, spraying is performed, and condensed water generated by the spraying and condensed water generated in the indirect cooler 10 are placed in the tar decanter 30. In the tar decanter, tar is separated from wastewater, and the wastewater is then treated by the biological treatment method in the present embodiment.

In the biological treatment method in the present embodiment, the above described wastewater is diluted with industrial water or the like, as necessary, so that the concentration of the COD component or the like becomes suitable for the biological treatment, thereby preparing subject water.

That is to say, in the present embodiment, the subject water is adjusted, so that the amount of phenol, thiocyanate, ammonia nitrogen or the like contained before or after dilution becomes suitable for the biological treatment, and thereafter, the biological treatment is carried out.

In the biological treatment method in the present embodiment, the subject water is supplied to the above described aeration tank 40, and a nitrification treatment is then carried out therein. At the same time, the COD component, such as the above described phenol or the above described thiocyanate, is decomposed (oxidized).

That is, the aeration tank 40 contains sludge containing ammonia-oxidizing bacteria, nitrite-oxidizing bacteria, phenol-degrading bacteria, thiocyanate-degrading bacteria and the like, and in the present embodiment, a biological treatment such as nitrification of an ammonia component or decomposition of phenol or thiocyanate is carried out with these bacteria.

At this time, the inflow of the subject water, which is to be supplied into the aeration tank 40, is controlled by a control valve 51 operable in association with a flow rate control apparatus 50, so that the amount of the COD component supplied into the aeration tank 40 is controlled.

It is important that the control by this flow rate control apparatus 50 is carried out with the use of program created based on the counting of the total number of bacteria in the aeration tank 40, which has been carried out in advance.

Specifically, it is important that, when the total number of bacteria in the sludge contained in the aeration tank 40 is set at n (copies) and the concentration of the COD component in the subject water is set at X (mg/liter), the flow rate V (liter/day) of the subject water per unit time is controlled within a predetermined range, so that the value of the amount of the COD component loaded on a single bacterium in the aeration tank 40 (COD component load: X×V/n) is controlled.

The treated water discharged from this aeration tank 40 can be used for various purposes, such as use for coke production equipment or a steelmaking plant, as long as the concentration of the COD component contained therein is reduced to approximately 100 (mg/liter) or less.

Moreover, even in a case in which the treated water is released to a river or the like, if the concentration of the COD component is controlled within the aforementioned range, it is not necessary to perform a broad-scale treatment to reduce the amount of the COD component.

In this respect, the concentration of the COD component in the treated water, which is to be discharged from the aeration tank 40, is more preferably 80 (mg/liter) or less, and particularly preferably 60 (mg/liter) or less.

In order to adjust the concentration of the COD component contained in the treated water discharged from the aeration tank 40 to the above described concentration, in general, the above described flow rate (V) may be controlled, so that, after the COD component is supplied into the aeration tank 40, the load of the COD component on the bacteria in the aeration tank 40 may become 100 (pg/copies/day) or less, although it depends on the shape of the aeration tank 40, aeration conditions, and the like.

Since the excessive limitation of the flow rate causes a reduction in treatment efficiency, the flow rate (V) is preferably controlled, so that, after the CO component is supplied into the aeration tank 40, the load of the COD component on the bacteria in the aeration tank 40 can become 10 (pg/copies/day) or more.

It is not always necessary to frequently count the total number of bacteria. However, if the total number of bacteria is not counted for a long period of time, it causes a risk that the total number of bacteria used as an indicator becomes significantly different from the actual total number of bacteria in the aeration tank 40, and as a result, the water quality of the treated water unexpectedly becomes deteriorated.

From this viewpoint, the step of counting the total number of bacteria is preferably carried out, generally at a frequency of one or more times every two weeks, and preferably at a frequency of one or more times every week.

In the conventional biological treatment method, the total number of bacteria has not been counted, and thus, no attention has been paid to the control of the load of the COD component using the total number of bacteria as an indicator.

The treated water discharged from the aeration tank 40 is introduced into a precipitation tank 60 to carry out precipitation separation, and the obtained supernatant liquid is then discharged for the next-stage treatment, and at the same time, the precipitated sludge is withdrawn and the thus withdrawn sludge is removed from the bottom of the tank.

A portion of the thus removed withdrawn sludge is returned as a returned sludge to the aeration tank 40, for example, and the remaining sludge can be treated as a residual sludge.

The amount of sludge contained in the aeration tank 40 can be changed by returning the sludge as described above.

Accordingly, it is possible to change the total number of bacteria contained in the aeration tank 40 by controlling the returned sludge.

That is to say, by controlling the amount of the returned sludge instead of controlling the amount of the introduced COD component by the control valve 51, the amount of the COD component loaded on a single bacterium per unit time in the aeration tank 40 (COD component load) can be controlled.

Moreover, it is also possible to control the total number of bacteria contained in the aeration tank 40 not only by controlling the returned sludge, but also by adding biologics and the like.

The control of the total number of bacteria in the aeration tank 40 and the control of the amount of a COD component introduced into the aeration tank 40 by the above described control valve 51 or the like can be carried out, independently. Otherwise, the two types of controls are simultaneously carried out, so that the COD component load in the aeration tank 40 can be controlled.

In the conventional biological treatment method, even in the case of subject water containing ammonia, phenol, thiocyanate and the like, the amount of the subject water, which is to be introduced into a biological treatment tank per unit time, has been controlled based on the concentration of a solid contained in the biological treatment tank, as with other biological treatments, so that the COD component loaded per unit mass of the solid could be kept at constant.

However, since sludge is constituted with inorganic substances and organic matters other than bacteria, as well as bacteria associated with water quality purification, it is hardly to say that the solid concentration accurately indicates the degradation ability of the COD component.

Moreover, sludge is constituted with various types of bacteria having different functions (namely, having different treatment targets), and the constitutional ratio of these bacteria depends on a change in the composition of subject water, solids retention time (SRT), etc.

Thus, it must be said that it is extremely disadvantageous in terms of accuracy to control the load of a specific substance (e.g. ammonia, phenol, etc.) based on the concentration of a solid that is a mixture of various types of bacteria and inorganic substances and the like.

In such a case, there is a fear that the COD component unexpectedly remains in the treated water.

On the other hand, in the biological treatment method according to the present embodiment, the total number of bacteria contained in sludge is counted, and on the basis of the counted number of bacteria, the amount of subject water, which is to be introduced into a biological treatment tank, or the amount of the returned sludge is controlled, so that the amount of a COD component loaded on a single bacterium can be controlled within a predetermined range.

That is to say, in the biological treatment method according to the present embodiment, prior to the introduction of the subject water into a biological treatment tank, a step of counting the total number of bacteria contained in the above described sludge and a step of controlling the amount of the COD component loaded on a single bacterium per unit time within a predetermined range on the basis of the total number of bacteria obtained in the above described step are carried out.

The above described step of controlling the amount of the COD component within a predetermined range is carried out by at least one of a step of controlling the amount of the subject water, which is to be introduced into the biological treatment tank, and a step of controlling the amount of the sludge in the biological treatment tank.

Accordingly, by counting the total number of bacteria in advance, the amount of the COD component decomposed in the biological treatment tank can be predicted, and as a result, the water quality required for the treated water can be maintained at a certain level or higher without unnecessarily reducing the amount of the subject water.

In the present embodiment, subject water contains large amounts of both phenol and thiocyanate, and thus, it is particularly difficult to predict the amounts of the COD components remaining in the treated water. Thus, there is exemplified a case in which condensed water generated by cooling exhaust gas discharged during production of coke from coal is treated in an aeration tank, because the effect of the present invention can be significantly exhibited therein. However, the present invention can be applied not only to condensed water generated in such a case, but also to the entire treatment of subject water containing substances, such as phenol or thiocyanate, which easily provide influences on the biological treatment.

In such a case, technical matters previously known with respect to biological treatment methods or apparatuses can be appropriately selected and adopted.

Examples

Hereinafter, the present invention will be described more in detail in the following examples. However, these examples are not intended to limit the scope of the present invention.

(Subject Water)

Wastewater containing ammonia, phenol, thiocyanate and the like, which was generated by indirectly or directly cooling gas emitted from a coke furnace, in which dry distillation of coal was carried out, was 4 times eluted with industrial water and seawater (wastewater:industrial water:seawater=1:1:2), and the obtained solution was used as subject water, which was to be subjected to a biological treatment.

(Aeration Tank)

The above described subject water was biologically treated in three aeration tanks.

Two out of the three aeration tanks have the same tank shape (17 m×19 m×4.6 m) and the same volume (1486 m$^8$), and the remaining one had a volume that was approximately ⅔ of the two other aeration tanks having the same shape (921 m$^3$; 14 m×14 m×4.7 m).

(Count of Total Number of Bacteria)

Before performing a biological treatment, sludge contained in each tank was sampled, and the number of bacteria was counted by the following method.

(Quantification of Number of Bacteria by Real-Time PCR)

Whole bacteria (eubacteria) associated with COD removal, ammonia-oxidizing bacteria and nitrite-oxidizing bacteria associated with nitrification of ammonia, phenol-degrading bacteria associated with decomposition of phenol that is hardly decomposable and highly toxic among COD components, and thiocyanate-degrading bacteria associated with decomposition of thiocyanate were each quantified by real-time PCR in terms of abundance.

Tables 1 and 2 show the names of primers and probes used in the real-time PCR, the nucleotide sequences thereof, and real-time PCR conditions.

(1) Quantification of Total Number of Bacteria

The number of whole bacteria (eubacteria) was quantified by a TaqMan probe method, using BACT1369F as a forward primer, PROK1492R as a reverse primer, and BACT1389 as a TaqMan probe.

(2) Quantification of Number of Ammonia-Oxidizing Bacteria (AOB)

The number of ammonia-oxidizing bacteria (AOB) was quantified by a TaqMan probe method, using a mixture prepared by mixing CTO189fA/B and CTO189fC at a molar ratio of 2:1 as a forward primer, RT1r as a reverse primer, and TMP1 as a TaqMan probe.

(3) Quantification of Number of Nitrite-Oxidizing Bacteria (NOB)

Quantification was performed on *Nitrospira* spp. and *Nitrobacter* spp.

The number of *Nitrospira* spp. was quantified by a TaqMan probe method, using NSR113f as a forward primer, NSR1264r as a reverse primer, and NSR1143Taq as a TaqMan probe.

On the other hand, the number of *Nitrobacter* spp. was quantified by a SYBR Green method, using NIT3f as a forward primer and NIT2r as a reverse primer.

(4) Quantification of Number of Phenol-Degrading Bacteria

The number of phenol-degrading bacteria was quantified by a SYBR Green method, using PHE-F as a forward primer and PHE-R as a reverse primer.

(5) Quantification of Number of Thiocyanate-Degrading Bacteria

Study papers regarding a method of detecting and/or quantifying thiocyanate-degrading bacteria by PCR were reviewed, and PCR reaction conditions were then analyzed using the PCR primers described in the papers. However, thiocyanate-degrading bacteria of interest could not be detected.

Hence, based on the sequence of the thiocyanate-degrading enzyme (thiocyanate hydrolase: scnC) gene registered in the database (http://www.ncbi.nlm.nih.gov/), primers/probes used for the quantification (TaqMan real-time PCR method) of 5 types of thiocyanate-degrading bacteria, as shown in Table 3, were designed.

It is to be noted that these PCR primers/probes used for detection and/or quantification of thiocyanate-degrading bacteria are described in Japanese Patent Application No. 2009-33617.

TABLE 1

| Target bacteria | Target gene | Primer/Probe | Primer/probe sequence (5' → 3') | Ref. |
|---|---|---|---|---|
| Ammonia-oxidizing bacteria (AOB) | AOB 16SrDNA | CTO 189fA/B | GGAGRAAAGCAGGGGATCG (SEQ ID NO: 1) | 1 |
| | | CTO 189fC | GGAGGAAAGTAGGGGATCG (SEQ ID NO: 2) | |
| | | RT1r | CGTCCTCTCAGACCARTACTG (SEQ ID NO: 3) | |
| | | TMP1 | FAM-CAACTAGCTAATCAGRCATCRGCCGCTC-TAMRA (SEQ ID NO: 4) | |
| Nitrite-oxidizing bacteria (NOB) | *Nitrospira* spp. 16SrDNA | NSR1113f | CCTGCTTTCAGTTGCTACCG (SEQ ID NO: 5) | 2 |

TABLE 1-continued

| Target bacteria | Target gene | Primer/Probe | Primer/probe sequence (5' → 3') | Ref. |
|---|---|---|---|---|
| | | NSR1264r | GTTTGCAGCGCTTTGTACCG (SEQ ID NO: 6) | |
| | | NSR1143Taq | FAM-AGCACTCTGAAAGGACTGCCCAGG-TAMRA (SEQ ID NO: 7) | |
| | *Nitrobacter* spp.. 16SrDNA | NIT3f | CGGAGCATGGAGCACAGG (SEQ ID NO: 8) | 3 |
| | | NIT2r | CGGGTTAGCGCACCGCCT (SEQ ID NO: 9) | |
| Phenol-degrading bacteria | Phenol monoxygenase | PHE-F | GTGCTGACSAAYCTGYTGTTC (SEQ ID NO: 10) | 4 |
| | | PHE-R | CGCCAGAACCAYTTRTC (SEQ ID NO: 11) | |
| Thiocyanate-degrading bacteria | Thiosyanate hydrolase | scnCTt1F | GGAAGTCAGCGATTTCGAGATT (SEQ ID NO: 12) | - |
| | | scnCTt1R | TCCACACGCGGTGGTCTT (SEQ ID NO: 13) | |
| | | scnCTt1Taq | FAM-CGAACTGGCCATGGAAAAAGGCC-TAMRA CGGTGAATACGTTCYCGG (SEQ ID NO: 14) | |
| Eubacteria | Eubacterial 16SrDNA | BACT1369F | CGGTGAATACGTTCYCGG (SEQ ID NO: 15) | 5 |
| | | PROK1492R | GGWTACCTTGTTACGACTT (SEQ ID NO: 16) | |
| | | BACT1389 | FAM-CTTGTACACACCGCCCGTC-TAMRA (SEQ ID NO: 17) | |

<References>
1. Hermansson, A, and Lindgren, P-E, Appl. Environ. Microbiol. 2001, 67, 972-976,
2. Harms, C., Layton, A. C., Dionisi, H. M., Garret, V. M., Hawkins, S. A., Robinson, K. G., and Sayler, G. S. Environ. Sci. Technol. 2003, 37, 343-351.
3. Wagner, M., Rath, G., Koops, H. -P., Flood, J., and Amman, R. I. 1996, 34, 237-244
4. Brett R. Baldwin, Cindy H. Nakatsu, and Loring Nies Appl. Environ. Microbiol. 2003, 69, 3350-3358.
5. Suzuki, M. T., Taylor, L. T., and Delong, E. F. Appl. Environ. Microbiol. 2000, 66, 4605-4614.

TABLE 2

| Target bacteria | Target gene | Primer/Probe Name | Primer/Probe Concentration (nM) | Step | Reaction temperature (° C.) | Time | Number of cycles |
|---|---|---|---|---|---|---|---|
| Ammonia-oxidizing bacteria (AOB) | AOB 16SrDNA | CTO189fA/B | 400[1)] | 1 | 50 | 2 min | 1 |
| | | CTO189fC | 400 | 2 | 95 | 15 min | 1 |
| | | RT1r | 150 | 3 | 94 | 15 sec | 35 |
| | | TMP1 | | | 60 | 1 min | |
| Nitrite-oxidizing bacteria (NOB) | *Nitrospira* spp. 16SrDNA | NSR113f | 200 | 1 | 50 | 2 min | 1 |
| | | NSR1264r | 200 | 2 | 95 | 15 min | 1 |
| | | NSR1143Taq | 150 | 3 | 94 | 15 sec | 40 |
| | | | | | 63 | 1 min | 1 |
| | *Nitrobacter* spp. 16SrDNA | NIT3f | 100 | 1 | 95 | 10 min | 1 |
| | | NIT2r | 100 | 2 | 95 | 15 sec | 35 |
| | | | | | 63 | 15 sec | |
| | | | | | 72 | 31 sec | |
| | | | | Dissociation | 95 | 15 sec | 1 |
| | | | | | 63 | 30 sec | |
| | | | | | 98 | 15 sec | |
| Phenol-degrading bacteria | Phenol monooxygenase | PHE-F | 300 | 1 | 95 | 10 min | 1 |
| | | PHE-R | 300 | 2 | 95 | 15 sec | 35 |
| | | | | | 55 | 30 sec | |
| | | | | | 72 | 35 sec | |

TABLE 2-continued

| Target bacteria | Target gene | Primer/Probe | | PCR reaction conditions | | | |
|---|---|---|---|---|---|---|---|
| | | Name | Concentration (nM) | Step | Reaction temperature (° C.) | Time | Number of cycles |
| | | | | Dissociation | 95 | 15 sec | 1 |
| | | | | | 60 | 30 sec | |
| | | | | | 95 | 15 sec | |
| Thiocyanate-degrading bacteria | Thiocyanate hydrolase (scnC) | scnCTt1F | 300 | 1 | 50 | 2 min | 1 |
| | | scnCTt1R | 300 | 2 | 95 | 10 min | 1 |
| | | scnCTt1Taq | 250 | 3 | 95 | 15 sec | 45 |
| | | | | | 60 | 1 min | |
| Eubacteria | Eubacterial 16SrDNA | BACT1369F | 200 | 1 | 50 | 2 min | 1 |
| | | PROK1492R | 300 | 2 | 95 | 10 min | 1 |
| | | BACT1389 | 200 | 3 | 95 | 15 sec | 35 |
| | | | | | 56 | 1 min | |

1)CTO189fA/B is mixed with CTO189fC at a molar ratio of 2:1 before use.

TABLE 3

| Target bacteria | Name of primer/probe | Sequence (5' → 3') |
|---|---|---|
| *Thibacillus thioparus* | scnCTt1F | GGAAGTCAGCGATTTCGAGATT (SEQ ID NO: 12) |
| | scnCTt1R | TCCACACGCGGTGGTCTT (SEQ ID NO: 13) |
| | scnCTt1Taq | FAM-CGAACTGGCCATGGAAAAAGGCC-TAMRA CGGTGAATACGTTCYCGG (SEQ ID NO: 14) |
| *Methylobacterium thiocyanatum* | scnCMt1F | CGATGGTTGGTCGGAGGAT (SEQ ID NO: 18) |
| | scnCMt1R | GCGATGCCGATCATGCA (SEQ ID NO: 19) |
| | scnCMt1Taq | FAM-ACTCGCAGAAATCGTCACCCGCG-TAMRA (SEQ ID NO: 20) |
| *Rhodococcus sp.* RHA1 | scnCRh1F | ACGCCTTCGCGACCAAT (SEQ ID NO: 21) |
| | scnCRh1R | TCTCCGAATGGGCCGAAT (SEQ ID NO: 22) |
| | scnCRh1Taq | FAM-TCGAACCACCCGACGGCCC-TAMRA (SEQ ID NO: 23) |
| *Mycobacterium smegmatis* | scnCMs1F | GATTTCACGGCTTTCAAGATTCTC (SEQ ID NO: 24) |
| | scnCMs1R | CACAACGCACACACGATCAC (SEQ ID NO: 25) |
| | scnCMs1Taq | FAM-AGGACACCCCGACGCTGCACC-TAMRA (SEQ ID NO: 26) |
| *Legionella pneumophila* | scnCLp1A | CGATTCCCAGTTCTTTACATGCT (SEQ ID NO: 27) |
| | scnCLp1R | GCCTGGGTAGATCCTGAATTCA (SEQ ID NO: 28) |
| | scnCLp1Taq | FAM-CTACCCCATCAGCGAGCAAACGTTTC-TAMRA (SEQ ID NO: 29) |

"F" in the name of primer/probe indicates a forward primer, "R" indicates a reverse primer, and "Taq" indicates a TaqMan probe. The 5' site of the TaqMan probe is labeled with FAM (6-carboxyfluoroscein), and the 3' site thereof is labeled with TAMRA (6-carboxytetramethylrhodamine).

Table 4 shows the water quality of subject water, which is to be supplied into each aeration tank, and the average value, maximum value and minimum value of a load caused by the inflow of the subject water.

It is to be noted that the aeration tank shown as "No. 3 AT" in the table is an aeration tank having a different volume, and the aeration tanks shown as "No. 7 AT" and "No. 8 AT" are two aeration tanks having the same volume.

Hereafter, these aeration tanks may also be referred to as "AT No. 3," "AT No. 7" and "AT No. 8," or simply, "No. 3," "No. 7" and "No. 8."

(Change in Amount of Phenol)

Figure 4:
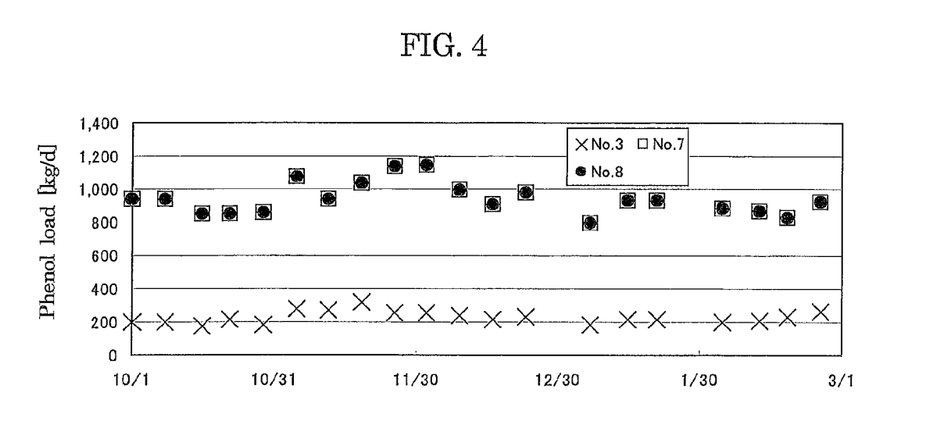
FIG. 4 is a graph showing a change in the amount of phenol introduced into each aeration tank for 1 day.

As the same as above, FIG. 4 shows the results obtained by observing the amount of phenol loaded on each aeration tank per day over approximately 150 days.

As shown in FIG. 4, the amount of the phenol loaded on "No. 3 AT" per day was changed from 180 to 317 kg/d, and the maximum value was found to be approximately 1.8 times higher than the minimum value.

On the other hand, "No. 7 AT" and "No. 8 AT" were operated under the same load, and the amount of the phenol

TABLE 4

| Aeration tank | | Water amount (m3/d) | Soluble COD Mn | | | NH4—N | | | Phenol | | | Thiocyanate | | |
|---|---|---|---|---|---|---|---|---|---|---|---|---|---|---|
| | | | Water quality (mg/L) | Load (kg/d) | Volume load | Water quality (mg/L) | Load (kg/d) | Volume load | Water quality (mg/L) | Load (kg/d) | Volume load | Water quality (mg/L) | Load (kg/d) | Volume load |
| No. 3AT | Average | 543 | 1,324 | 719 | 0.78 | 893 | 485 | 0.53 | 422 | 229 | 0.25 | 95 | 51 | 0.06 |
| | Maximum | 576 | 1,559 | 898 | 0.97 | 1,002 | 577 | 0.63 | 550 | 317 | 0.34 | 112 | 64 | 0.07 |
| | Minimum | 552 | 1,061 | 586 | 0.64 | 769 | 369 | 0.40 | 335 | 180 | 0.20 | 74 | 41 | 0.04 |
| No. 7AT | Average | 2,224 | 1,324 | 2,944 | 1.98 | 893 | 1,985 | 1.34 | 422 | 938 | 0.63 | 95 | 211 | 0.14 |
| | Maximum | 2,186 | 1,559 | 3,408 | 2.29 | 1,002 | 2,170 | 1.46 | 550 | 1,146 | 0.77 | 112 | 235 | 0.16 |
| | Minimum | 2,374 | 1,061 | 2,519 | 1.69 | 769 | 1,699 | 1.14 | 335 | 795 | 0.53 | 74 | 175 | 0.12 |
| No. 8AT | Average | 2,224 | 1,324 | 2,944 | 1.98 | 893 | 1,985 | 1.34 | 422 | 938 | 0.63 | 95 | 211 | 0.14 |
| | Maximum | 2,186 | 1,559 | 3,408 | 2.29 | 1,002 | 2,170 | 1.46 | 550 | 1,146 | 0.77 | 112 | 235 | 0.16 |
| | Minimum | 2,374 | 1,061 | 2,519 | 1.69 | 769 | 1,699 | 1.14 | 335 | 795 | 0.53 | 74 | 175 | 0.12 |

(Change in Amount of COD Component)

Figure 2:
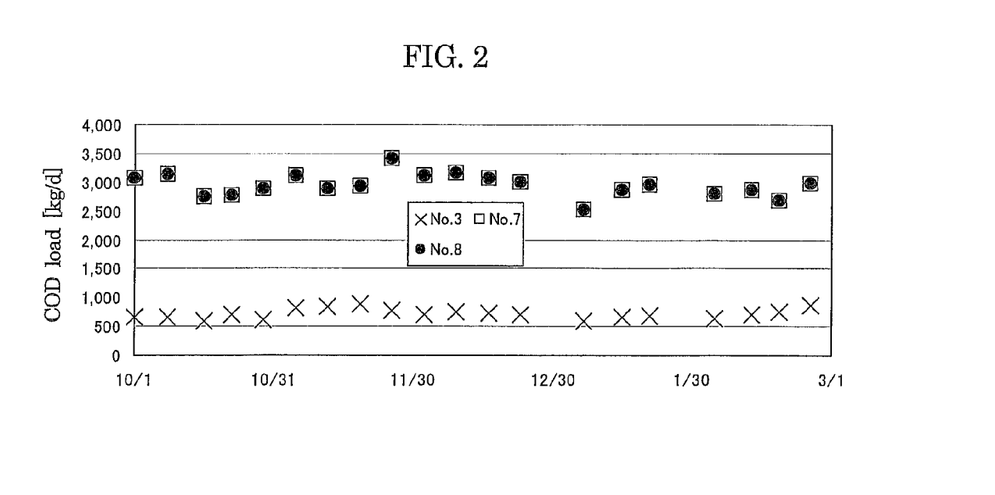
FIG. 2 is a graph showing a change in the amount of a COD component introduced into each aeration tank for 1 day in the examples.

FIG. 2 shows a change in the amount of a COD component loaded on each aeration tank for 1 day during an evaluation period (approximately 150 days).

As shown in FIG. 2, the amount of the COD component loaded on "No. 3 AT" per day was changed from 586 to 898 kg/d, and the maximum value was found to be approximately 1.5 times higher than the minimum value.

On the other hand, "No. 7 AT" and "No. 8 AT" were operated under the same load, and the amount of the COD component was changed from 2520 to 3400 kg/d. The maximum value was found to be approximately 1.4 times higher than the minimum value.

"No. 3 AT" differs from "No. 7 AT" and "No. 8 AT" in terms of volume load. The aeration tanks "No. 7 AT" and "No. 8 AT" were operated under a volume load that was approximately 2.5 times higher than that of "No. 3 AT."

(Change in Amount of Ammonia Nitrogen (NH4-N) Component)

Figure 3:
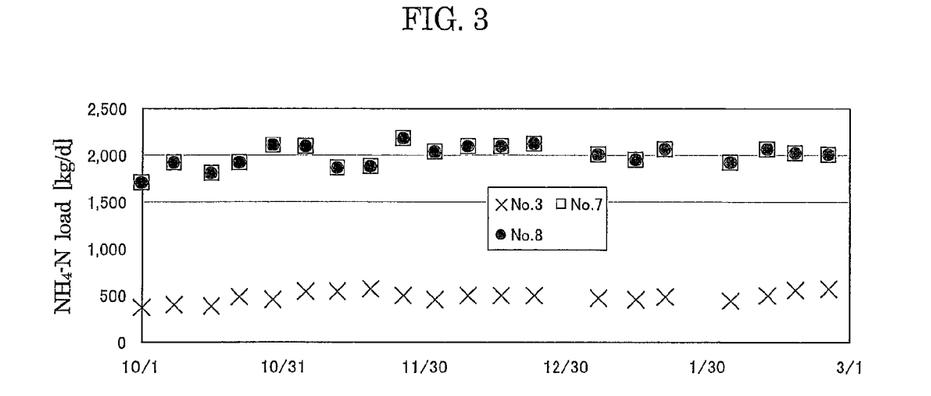
FIG. 3 is a graph showing a change in the amount of ammonia nitrogen introduced into each aeration tank for 1 day.

FIG. 3 shows the results obtained by observing the amount of ammonia nitrogen loaded on each aeration tank per day over approximately 150 days.

As shown in FIG. 3, the amount of the NH4-N component loaded on "No. 3 AT" per day was changed from 369 to 577 kg/d, and the maximum value was found to be approximately 1.6 times higher than the minimum value.

On the other hand, "No. 7 AT" and "No. 8 AT" were operated under the same load, and the amount of the NH4-N component was changed from 1699 to 2170 kg/d. The maximum value was found to be approximately 1.3 times higher than the minimum value.

was changed from 795 to 1146 kg/d. The maximum value was found to be approximately 1.4 times higher than the minimum value.

(Change in Amount of Thiocyanate)

Figure 5:
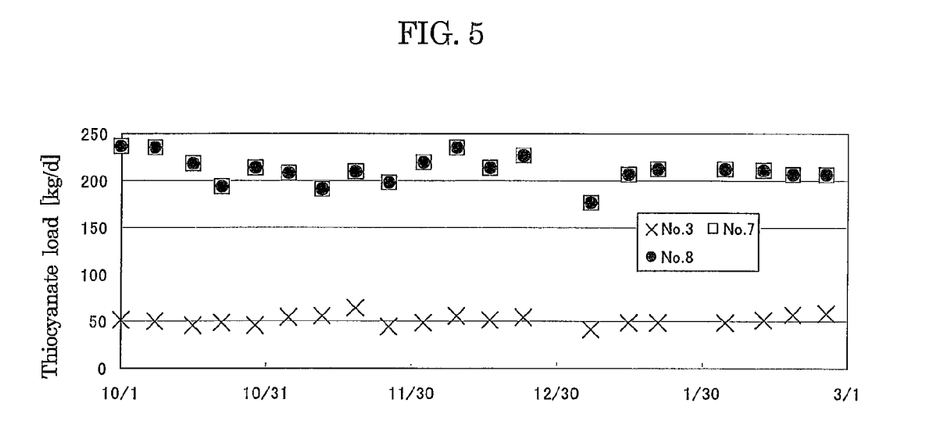
FIG. 5 is a graph showing a change in the amount of thiocyanate introduced into each aeration tank for 1 day.

As the same as above, FIG. 5 shows the results obtained by observing the amount of thiocyanate loaded on each aeration tank per day over approximately 150 days.

As shown in FIG. 5, the amount of the thiocyanate loaded on "No. 3 AT" per day was changed from 41 to 64 kg/d, and the maximum value was found to be approximately 1.6 times higher than the minimum value.

On the other hand, "No. 7 AT" and "No. 8 AT" were operated under the same load, and the amount of the thiocyanate was changed from 175 to 235 kg/d. The maximum value was found to be approximately 1.3 times higher than the minimum value.

Table 5 shows the water quality of the treated water, and the average value, maximum value and minimum value of the removal rate [(loaded amount−amount remaining in treated water)/loaded amount×100%] load of each component.

There was no significant difference among the three aeration tanks in terms of the removal rate of soluble $COD_{Mn}$. In terms of the water quality of the treated water, "No. 3 AT" was lowest. Then, "No. 8 AT" and "No. 7 AT" exhibited higher water quality in this order.

It is assumed that a difference in the water quality of the treated water would be caused by a difference in COD load per number of bacteria, although this will be described later.

NH4-N was hardly removed, that is, was hardly oxidized to NO2-N, and the maximum removal rate was from 10% to 19%.

Phenol was removed at a percentage of almost 100% in all of the aeration tanks, and the highest concentration of phenol in the treated water was 0.1 mg/l or less.

The removal rate of thiocyanate was 97% (average) in all of the aeration tanks, and thus, it was well treated.

TABLE 5

| Aeration tank | | Soluble COD Mn | | NH4—N | | Phenol | | Thiocyanate | |
|---|---|---|---|---|---|---|---|---|---|
| | | Water quality (mg/L) | Removal rate (%) | Water quality (mg/L) | Removal rate (%) | Water quality (mg/L) | Removal rate (%) | Water quality (mg/L) | Removal rate (%) |
| No. 3 AT | Average | 77 | 94.1 | 857 | 3.7 | 0.043 | 100.0 | 2.4 | 97.5 |
| | Maximum | 94 | 95.5 | 980 | 15.9 | 0.100 | 100.0 | 7.0 | 98.1 |
| | Minimum | 55 | 92.7 | 700 | 0.0 | 0.026 | 100.0 | 2.0 | 93.7 |
| No. 7AT | Average | 92 | 93.1 | 909 | 0.0 | 0.049 | 100.0 | 2.3 | 97.6 |
| | Maximum | 120 | 94.2 | 1,000 | 19.3 | 0.100 | 100.0 | 3.0 | 98.2 |
| | Minimum | 80 | 91.7 | 690 | 0.0 | 0.030 | 100.0 | 2.0 | 96.5 |
| No. 8AT | Average | 83 | 94.0 | 926 | 0.0 | 0.047 | 100.0 | 2.2 | 97.8 |
| | Maximum | 96 | 94.7 | 1,000 | 10.8 | 0.090 | 100.0 | 3.0 | 98.1 |
| | Minimum | 71 | 93.1 | 850 | 0.0 | 0.030 | 100.0 | 2.0 | 96.9 |

Table 6 shows the average value, maximum value and minimum value of whole bacteria, ammonia-oxidizing bacteria (AOB), nitrite-oxidizing bacteria (NOB), phenol-degrading bacteria, and thiocyanate-oxidizing bacteria, each of which exists in 1 mg of sludge contained in each aeration tank.

TABLE 6

| Aeration tank | | Number of bacteria (copies/1 mg MLSS) | | | | |
|---|---|---|---|---|---|---|
| | | Whole bacteria | Ammonia-oxidizing bacteria | Nitrite-oxidizing bacteria (*Nitrobacter*) | Phenol-degrading bacteria | Thiocyanate-degrading bacteria |
| No. 3 AT | Average | 4.88E+09 | 4.21E+06 | 7.47E+06 | 5.35E+07 | 1.40E+06 |
| | Maximum | 6.78E+09 | 3.48E+07 | 2.60E+07 | 1.71E+08 | 7.15E+06 |
| | Minimum | 3.01E+09 | 3.79E+04 | 8.37E+05 | 2.21E+07 | 1.35E+04 |
| No. 7AT | Average | 4.56E+09 | 3.19E+05 | 1.84E+06 | 1.45E+08 | 2.28E+05 |
| | Maximum | 6.03E+09 | 3.87E+06 | 3.50E+06 | 3.39E+08 | 1.14E+06 |
| | Minimum | 2.16E+09 | 7.98E+04 | 6.56E+05 | 4.37E+07 | 9.05E+03 |
| No. 8AT | Average | 5.40E+09 | 1.56E+06 | 5.11E+06 | 8.71E+07 | 2.84E+04 |
| | Maximum | 9.13E+09 | 5.83E+06 | 1.03E+07 | 2.16E+08 | 6.49E+04 |
| | Minimum | 3.96E+09 | 5.56E+04 | 2.47E+06 | 2.99E+07 | 5.77E+03 |

(Change in Total Number of Bacteria)

Figure 6:
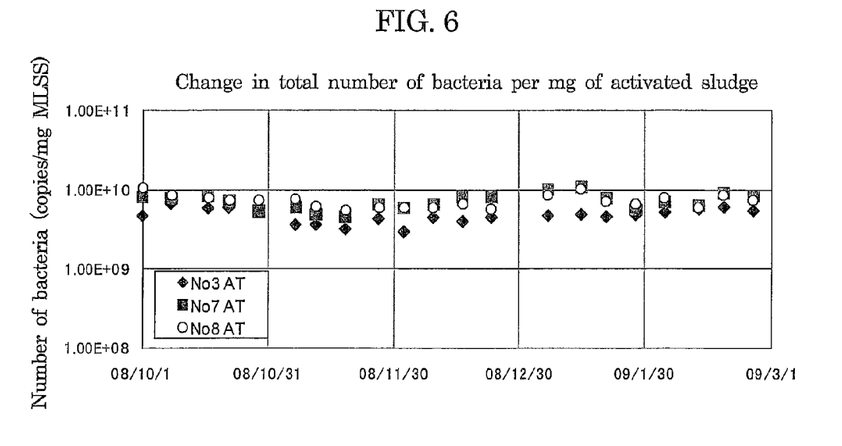
FIG. 6 is a graph showing a change in the total number of bacteria in each aeration tank.

FIG. 6 shows the results obtained by observing the total number of bacteria (eubacteria) existing in 1 mg of sludge contained in each aeration tank over approximately 150 days (a change in the number of bacteria).

There was found no significant difference among the aeration tanks, in terms of the total number of bacteria contained in the sludge.

In addition, the total number of bacteria in a single aeration tank was not changed so much over time, and the number of bacteria was relatively stable (approximately $5\times10^9$ (copies/mg MLSS)).

(Change in Number of Ammonia-Oxidizing Bacteria (AOB))

Figure 7:
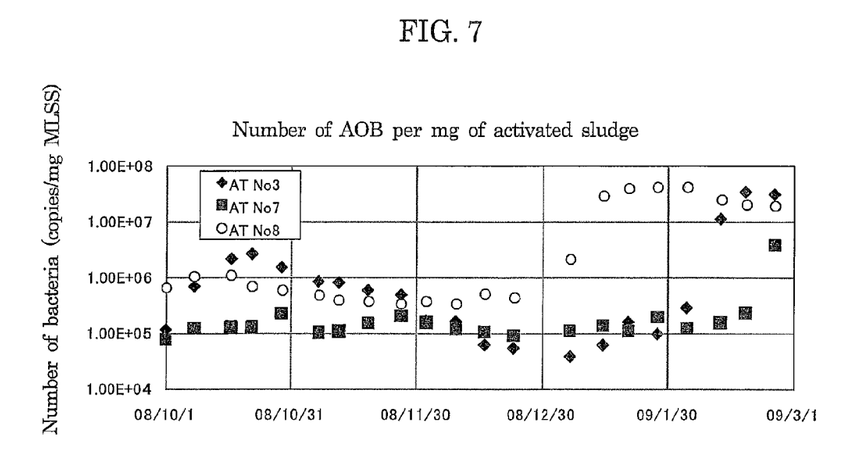
FIG. 7 is a graph showing a change in the number of ammonia-oxidizing bacteria (AOB) in each aeration tank.

FIG. 7 shows the results obtained by observing the number of AOB existing in 1 mg of sludge contained in each aeration tank over approximately 150 days (a change in the number of bacteria).

There was found a difference among the aeration tanks, in terms of the number of AOB in the sludge.

That is, the number of AOB in the sludge was smallest in "No. 7 AT," and it was found to be $3.19\times10^5$ (copies/mg MLSS). The number of AOB in the sludge in "No. 3 AT," which contained the largest number of bacteria, was found to be $4.21\times10^6$ (copies/mg MLSS). Thus, there was a difference of 10 times in their numbers.

Moreover, the number of AOB in a single aeration tank was significantly changed over time, and the maximum value thereof was 100 times higher than the minimum value thereof.

(Change in Number of Nitrite-Oxidizing Bacteria (NOB))

Figure 8:
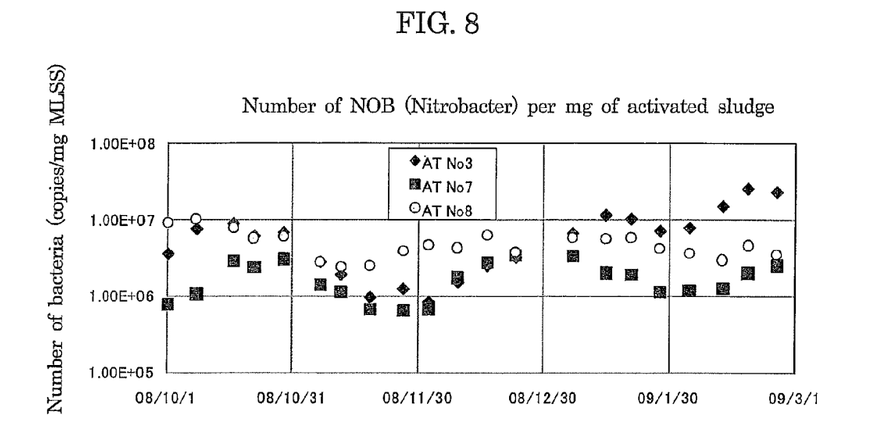
FIG. 8 is a graph showing a change in the number of nitrite-oxidizing bacteria (NOB) in each aeration tank.

FIG. 8 shows the results obtained by observing the number of NOB existing in 1 mg of sludge contained in each aeration tank over approximately 150 days (a change in the number of bacteria).

As in the case of AOB, in terms of the number of NOB existing in the sludge, there was found a difference among the aeration tanks. In addition, the number of NOB in a single aeration tank was periodically changed, and the maximum value thereof was approximately 10 times higher than the minimum value thereof.

(Change in Number of Phenol-Degrading Bacteria)

Figure 9:
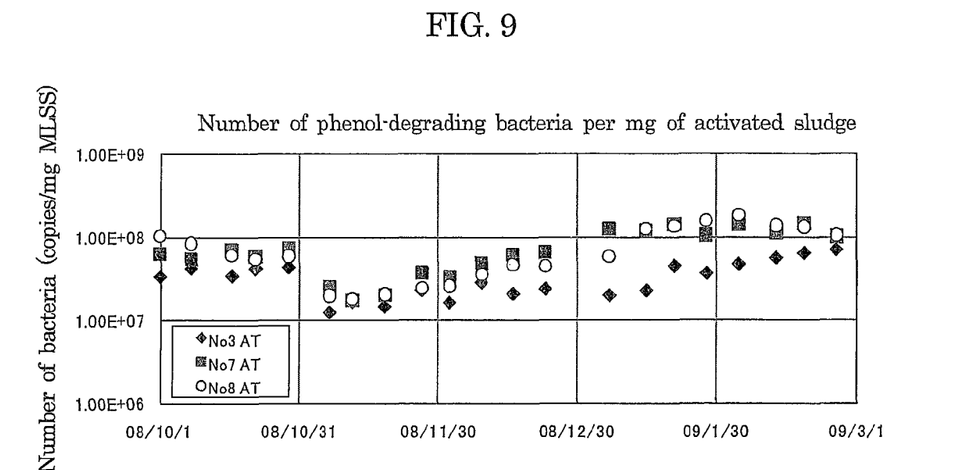
FIG. 9 is a graph showing a change in the number of phenol-degrading bacteria in each aeration tank.

FIG. 9 shows the results obtained by observing the number of phenol-degrading bacteria in 1 mg of sludge contained in each aeration tank over approximately 150 days (a change in the number of bacteria).

As a result, in terms of the number of phenol-degrading bacteria, there was almost no difference between the aeration tank "No. 7" and the aeration tank "No. 8," but the number of the bacteria contained in the aeration tank "No. 3" was smaller than those of two other aeration tanks.

Moreover, the number of the phenol-degrading bacteria in a single aeration tank was changed, and it became lowest after approximately 30 days had passed. Thereafter, the number of the bacteria moderately increased.

(Change in Number of Thiocyanate-Degrading Bacteria)

Figure 10:
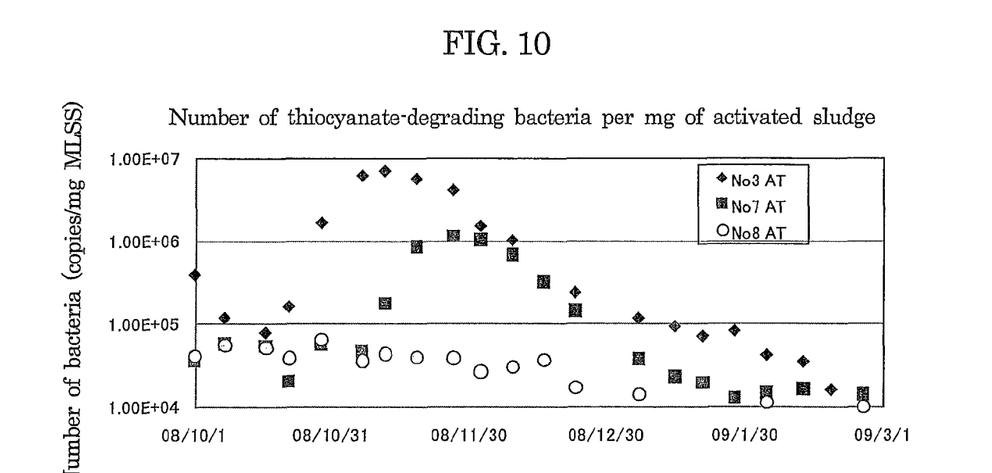
FIG. 10 is a graph showing a change in the number of thiocyanate-degrading bacteria in each aeration tank.

FIG. 10 shows the results obtained by observing the number of thiocyanate-degrading bacteria in 1 mg of sludge contained in each aeration tank over approximately 150 days (a change in the number of bacteria).

In terms of the number of the present bacteria existing in each aeration tank, there was found a significant difference among the aeration tanks. The largest number of the present bacteria were present in the aeration tank "No. 3," and the number of the bacteria in "No. 3" was approximately 100 times larger than that in the aeration tank "No. 8," in which the smallest number of the bacteria were present.

Subsequently, there was analyzed a correlation among: the total number of bacteria, the number of ammonia-oxidizing bacteria, the number of nitrite-oxidizing bacteria, the number of phenol-degrading bacteria, and the number of thiocyanate-degrading bacteria, each of which was obtained by a biological diagnostic technique (quantitative PCR method); COD component load, ammonia load, nitrite load, phenol load, and thiocyanate load; and the water quality of the treated water.

The results are shown in Table 7.

Figure 11:
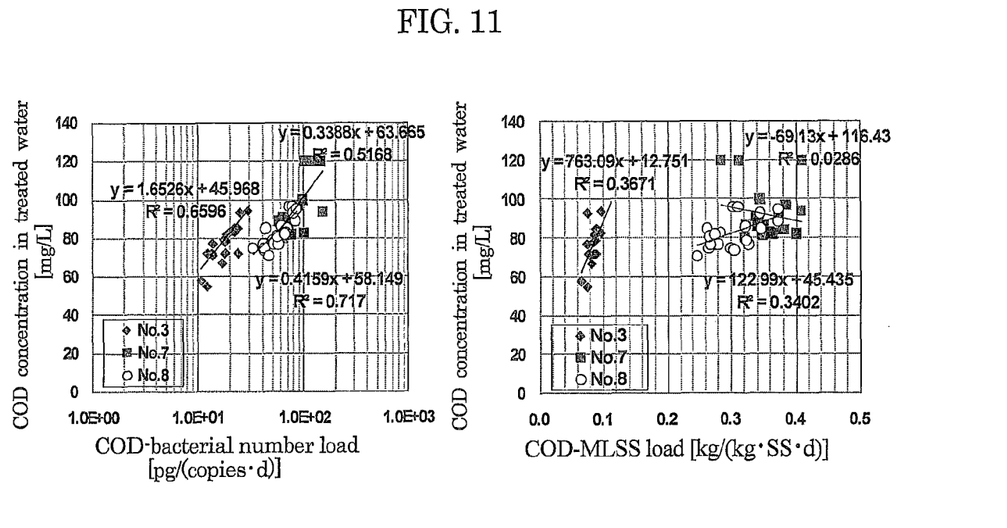
FIG. 11 includes a graph showing the relationship between the amount of a COD component treated by a single bacterium per day and the water quality of the treated water (left figure), and a graph showing the relationship between the amount of a COD component treated per MLSS and the water quality of the treated water (right figure).

On the other hand, as shown in FIG. 11 (right figure), in the relationship between a COD component load per MLSS (COD-MLSS load), which has been used as a control indicator in the conventional biological treatment, and the COD concentration in the treated water, a correlation coefficient ($R^2$) is lower than that in the left figure, and the inclination of a regression line becomes positive or negative depending on the type of an aeration tank used, causing a certain variation.

As described above, it is found that, in the biological treatment of subject water containing phenol or thiocyanate, the number of bacteria constituting sludge is quantified by a biological diagnostic technique, and a new control indicator "COD component load on a single bacterium" is determined,

TABLE 7

| Bacteria | Aeration tank | COD load (kg/d) | COD Concentration in treated water (mg/L) | Phenol load (kg/d) | Thiocyanogen load (kg/d) | Thiocyanate concentration in treated water (mg/L) | $(NH_4)_2S_2O_3$ load (kg/d) | $(NH_4)_2S_2O_3$ Concentration in treated water (mg/L) |
|---|---|---|---|---|---|---|---|---|
| Whole bacteria | No. 3AT | *−0.474 | **−0.765 | **−0.669 | −0.238 | −0.325 | 0.269 | 0.213 |
|  | No. 7AT | −0.276 | **−0.752 | *−0.557 | 0.240 | 0.167 | 0.378 | 0.090 |
|  | No. 8AT | −0.110 | **−0.649 | −0.341 | 0.324 | −0.987 | 0.165 | 0.227 |
| Ammonia-oxidizing bacteria | No. 3AT | 0.300 | −0.321 | 0.123 | 0.430 | −0.136 | 0.385 | **0.632 |
|  | No. 7AT | 0.029 | −0.095 | −0.048 | −0.095 | −0.139 | 0.203 | 0.005 |
|  | No. 8AT | −0.810 | −0.213 | −0.291 | −0.081 | −0.260 | −0.084 | −0.343 |
| Nitrite-oxidizing bacteria | No. 3AT | 0.098 | **−0.766 | −0.085 | 0.256 | −0.174 | 0.317 | **0.633 |
|  | No. 7AT | *−0.506 | **−0.596 | −0.425 | −0.205 | −0.010 | 0.033 | −0.039 |
|  | No. 8AT | 0.407 | **−0.642 | −0.304 | 0.407 | 0.111 | 0.228 | −0.317 |
| Phenol-degrading bacteria | No. 3AT | 0.178 | −0.165 | −0.011 | 0.338 | −0.217 | 0.428 | 0.431 |
|  | No. 7AT | −0.472 | −0.363 | *−0.460 | −0.194 | −0.415 | 0.024 | −0.394 |
|  | No. 8AT | −0.351 | −0.312 | −0.411 | 0.017 | 0.163 | 0.140 | −0.236 |
| Thiocyanate-degrading bacteria | No. 3AT | **0.661 | 0.145 | **0.749 | 0.349 | 0.356 | −0.399 | −0.086 |
|  | No. 7AT | **0.607 | **0.732 | **0.783 | 0.075 | 0.209 | 0.075 | 0.160 |
|  | No. 8AT | 0.279 | 0.06 | 0.117 | 0.185 | 0.163 | 0.048 | 0.423 |

In the case of numerical value with "*" on left side, P value indicating significance probability is less than 0.05, and in the case of numerical value with "**" on left side, P value is less than 0.01.

As shown in Table 7, a negative correlation was found at a standard of 1% between the total number of bacteria and the COD concentration in the treated water, and also between the number of nitrite-oxidizing bacteria (NOB) and the COD concentration in the treated water.

That is, as the concentration of COD in the treated water increased, the total number of bacteria and the number of NOB tended to decrease.

It is assumed that since a hardly decomposable COD component affected these bacteria and inhibited the growth thereof in this analysis, the aforementioned results could be obtained.

(Relationship Between COD Component Load and Number of Bacteria in Treated Water)

In order to determine the operation control indicator of equipment for treating wastewater generated as a result of a treatment on coke used in this analysis, the relationship between a COD component load on a single bacterium (the amount of a COD component treated by a single bacterium for 1 day) and the water quality of the treated water was analyzed.

As shown in FIG. 11 (left figure), there was found a high correlation between the COD component load on a single bacterium and the water quality of the treated water, and as the COD component load on a single bacterium increased, the concentration of COD in the treated water also increased.

Accordingly, it is considered that the water quality of the treated water can be controlled by retaining in a biological treatment tank, a number of bacteria that is appropriate to the COD component load supplied.

so that the water quality of the treated water can be controlled by the present biological treatment method more accurately than the conventional method of controlling a load based on MLSS.

As stated above, since the conventional method of controlling a load based on MLSS predicts the removal rate of a COD component with low accuracy, when the amount of the COD component remaining in the treated water should be reliably controlled to a certain value or less, there may be a case in which the amount of the COD component loaded on bacteria becomes significantly lower than the decomposing ability of the bacteria. Thus, the conventional method has been problematic in that the bacteria cannot exhibit their ability.

On the other hand, according to the present invention, since a load imposed on a single bacterium can be directly controlled, a state in which the bacteria can exhibit their decomposing ability to the maximum can be maintained.

That is to say, from the aforementioned viewpoint as well, it is found that the biological treatment method of the present invention is superior to the conventional biological treatment method.

(Concerning Individual Bacteria)

(Relationship Between the Number of NOB and COD Concentration in Treated Water)

Figure 12:
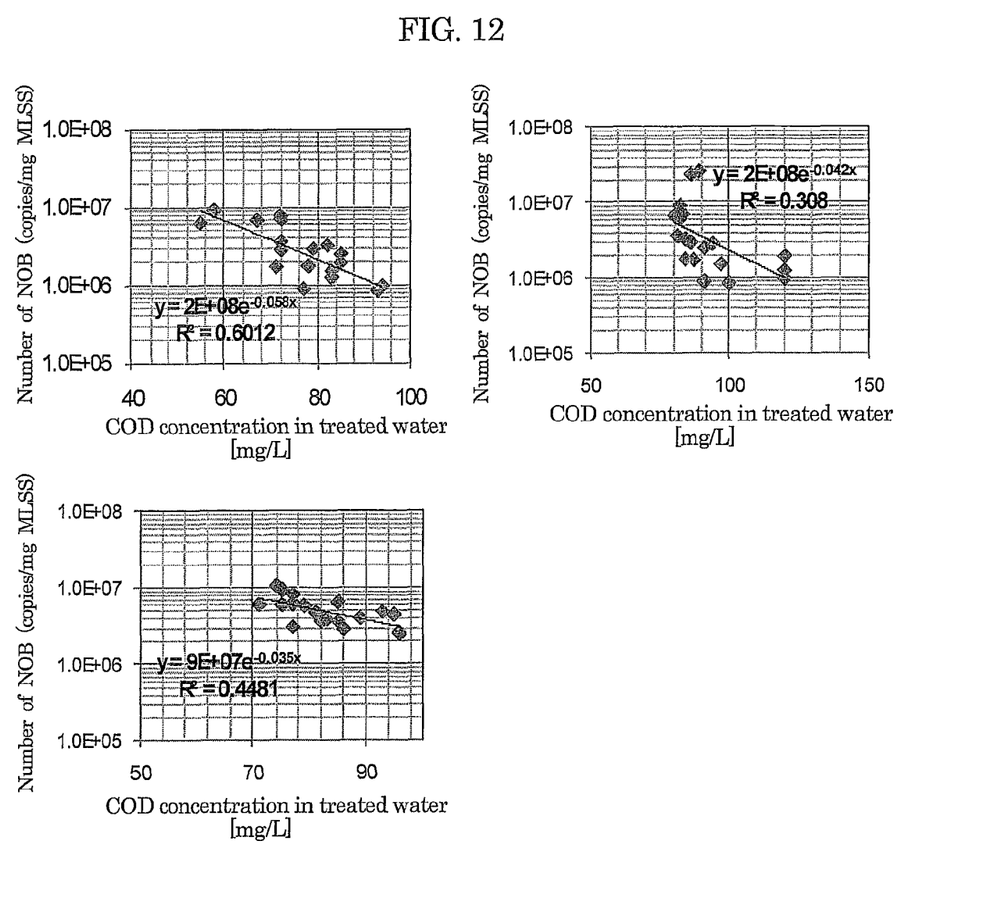
FIG. 12 is a graph showing the relationship between the number of nitrite-oxidizing bacteria (NOB) in each aeration tank and the COD concentration in the treated water.

The relationship between the number of NOB in each aeration tank and the COD concentration in the treated water is shown in FIG. 12.

As is found from this figure, as the concentration of COD that was not decomposed in the aeration tank and remained in the treated water increased, the number of NOB tended to decrease.

In general, NOB is not associated with the decomposition of an organic COD component. Thus, the above observed tendency suggests that the remaining COD component inhibited the growth of NOB, and thus it is considered that NOB can be utilized as an indicator for recognizing the inflow of a harmful component.

(Phenol-Phenol-Degrading Bacteria Load and Thiocyanate-Thiocyanate-Degrading Bacteria Load)

As shown in FIG. 11, the amount of phenol loaded on a single phenol-degrading bacterium per unit time (phenol load) and the amount of thiocyanate loaded on a single thiocyanate-degrading bacterium per unit time (thiocyanate load) were analyzed. However, there was found no correlation between them.

As shown in Table 8 below, in "No. 3 AT" and "No. 7 AT," the maximum value of a phenol load on a single phenol-degrading bacterium was approximately 7.5 times greater than the minimum value thereof. In "No. 8 AT," the maximum value thereof was significantly (approximately 9.4 times) greater than the minimum value thereof.

Nevertheless, the phenol concentration in the treated water was 0.1 mg/l or less, and thus phenol was extremely favorably treated (removal rate: approximately 100%).

Accordingly, it is assumed that, if each aeration tank is operated such that the phenol load on the phenol-degrading bacteria becomes the maximum load or less of each aeration tank, good water quality can be achieved.

In the aeration tanks "No. 3 AT," "No. 7 AT," and "No. 8 AT," the maximum value of the amount of thiocyanate loaded on a single thiocyanate-degrading bacterium per unit time (thiocyanate load) was much greater than the minimum value thereof (approximately 710 times, approximately 160 times and approximately 9 times higher, respectively, in the aforementioned tanks). Nevertheless, good water quality was achieved (thiocyanate concentration in the treated water: 7.0 mg/l or less; removal rate: 93% or more).

Accordingly, it is assumed that, if each aeration tank is operated such that the thiocyanate load on the thiocyanate-degrading bacteria becomes the maximum load or less of each aeration tank, good water quality can be achieved.

TABLE 8

| Aeration tank | | Phenol-phenol-degrading bacteria load (pg/copy/d) | Thiocyanate-thiocyanate-degrading bacteria load (pg/copy/d) |
|---|---|---|---|
| No. 3 AT | Average | 738 | 90,774 |
| | Maximum | 1.535 | 574,561 |
| | Minimum | 204 | 810 |
| No. 7 AT | Average | 1.225 | 883,369 |
| | Maximum | 2.313 | 3,342,440 |
| | Minimum | 312 | 20,891 |
| No. 8 At | Average | 1.811 | 1,220,969 |
| | Maximum | 3.596 | 3,390,189 |
| | Minimum | 381 | 373,309 |

As stated above, by counting the total number of bacteria in advance, the amount of a COD component decomposed in a biological treatment tank can be predicted, and as a result, the water quality required for the treated water can be maintained at a certain level or higher without unnecessarily reducing the amount of subject water.

In addition, by counting the number of nitrite-oxidizing bacteria as well as the total number of bacteria, it becomes possible to figure out the inflow of harmful components to a biological treatment, such as phenol or thiocyanate.

Moreover, the number of phenol-degrading bacteria and the number of thiocyanate-degrading bacteria have also been counted, and thus, the maximum load capable of controlling the residual amount of phenol or thiocyanate in the treated water within a predetermined level or less has been figured out in advance. Thereafter, a biological treatment is carried out using the maximum load as an indicator, so that the treated water can reliably have good water quality.

That is to say, by counting the number of phenol-degrading bacteria and the number of thiocyanate-degrading bacteria as well, the treatment efficiency of the biological treatment can be improved as compared with the conventional biological treatment method, while more reliably suppressing that the treated water does not have a desired water quality.

DESCRIPTION OF REFERENCE SIGNS

10: indirect cooler, 11: cooling tube, 20: direct cooler, 21: scrubber, 30: tar decanter, 40: aeration tank (biological treatment tank), 50: flow rate control apparatus, 51: control valve, 60: precipitation tank

The invention claimed is:

1. A biological treatment method comprising introducing subject water containing a COD component, wherein the COD component is at least one of phenol and thiocyanate, into a biological treatment tank containing sludge containing eubacteria capable of decomposing the COD component to thereby biologically treat the COD component with the eubacteria, wherein:

before the introduction of the subject water into the biological treatment tank, a step of counting the total number of eubacteria contained in the sludge is carried out; and the amount of the COD component loaded on each of the eubacteria counted in the step, per unit time is controlled within a predetermined range of at least 10 pg/copies/day and less than 100 pg/copies/day in the treatment by controlling at least one of the amount of the COD component introduced into the biological treatment tank and the amount of sludge contained in the biological treatment tank, thereby controlling the concentration of the COD component in the treated water discharged from the biological treatment tank to 100 mg/liter or less.

2. The biological treatment method according to claim 1, wherein the subject water contains condensed water generated by cooling exhaust gas emitted when coke is produced from coal.

3. The biological treatment method according to claim 1, wherein the concentration of the COD component in the treated water discharged from the biological treatment tank is 80 mg/liter or less.

4. The biological treatment method according to claim 1, wherein the concentration of the COD component in the treated water discharged from the biological treatment tank is 60 mg/liter or less.

5. The biological treatment method according to claim 1, wherein the concentration of the COD component in the treated water discharged from the biological treatment tank is 0.1 mg/liter or less.

* * * * *